(12) United States Patent
Richards et al.

(10) Patent No.: US 7,815,202 B2
(45) Date of Patent: Oct. 19, 2010

(54) VERSATILE AUTO PARTS CART

(75) Inventors: Robert M. Richards, Waterloo, IA (US); Don G. Kobriger, Elk Run Heights, IA (US)

(73) Assignee: Collision Services, Inc., Hudson, IA (US)

( * ) Notice: Subject to any disclaimer, the term of this patent is extended or adjusted under 35 U.S.C. 154(b) by 441 days.

(21) Appl. No.: 12/001,111

(22) Filed: Dec. 10, 2007

(65) Prior Publication Data
US 2008/0143069 A1   Jun. 19, 2008

Related U.S. Application Data

(60) Provisional application No. 60/874,812, filed on Dec. 14, 2006.

(51) Int. Cl.
B62B 3/00    (2006.01)
A47B 57/00   (2006.01)

(52) U.S. Cl. ............ 280/79.7; 280/79.3; 280/639; 211/187; 211/190; 211/126.8; 211/207; 211/193; 211/195; 211/41.14

(58) Field of Classification Search ........... 280/47.34, 280/47.35, 79.11, 79.3, 79.7, 79.2, 47.19, 280/35, 639; 211/187, 190, 126.8, 126.9, 211/133.2, 133.5, 189, 207, 195, 193, 41.14, 211/41.15
See application file for complete search history.

(56) References Cited

U.S. PATENT DOCUMENTS

| | | | | |
|---|---|---|---|---|
| D162,230 S | * | 2/1951 | Sasser | D34/21 |
| 2,926,022 A | * | 2/1960 | Nau et al. | 280/79.3 |
| 3,052,484 A | * | 9/1962 | Huffman et al. | 280/654 |
| 3,281,102 A | * | 10/1966 | Hobson | 248/125.3 |
| 4,032,165 A | * | 6/1977 | Russell | 280/79.3 |
| 4,501,369 A | * | 2/1985 | Fox | 211/133.1 |

(Continued)

OTHER PUBLICATIONS

Collision Services, Inc., 1987-88 catalog—Profit-making Bodyshop Products, Parts Caddy, p. 3, Hudson, IA.

(Continued)

Primary Examiner—J. Allen Shriver, II
Assistant Examiner—John R Olszewski
(74) Attorney, Agent, or Firm—Allan L. Harms; Shuttleworth & Ingersoll, PLC

(57) ABSTRACT

An improved utility cart for use in auto body repair facilities. The cart includes an upright frame from which one or more shelf or basket members extend generally horizontally. Extensions on the spaced apart legs of the cart include at least two elongate upright posts which are spaced apart sufficiently to receive a thin auto body part such as a hood panel or windshield. Elongate support arms may be attached to the upright members of the frame by inserting tabs of the arms into slots in the upright members. The shelf and basket members are supported on a pair of side brackets which have tabs which are received in slots in the upright members. The legs may be adjusted from a parallel position to one which has the legs diverging. The legs are supported by casters mounted at the ends of the legs and at the ends of the leg extensions. A small parts drawer may be carried in a drawer support which can be suspended from either a shelf or a basket member. S-hooks and elastic cords may be attached to cross bars separating the upright members, or from the elongate support arms or the side brackets of the shelf or basket members.

12 Claims, 10 Drawing Sheets

U.S. PATENT DOCUMENTS

| | | | | |
|---|---|---|---|---|
| 5,660,637 | A * | 8/1997 | Dodge | 118/500 |
| 5,884,778 | A * | 3/1999 | Freiheit | 211/41.14 |
| 6,669,213 | B2 * | 12/2003 | Woerner | 280/47.35 |
| 6,929,269 | B2 * | 8/2005 | Oliver | 280/47.18 |
| 6,935,523 | B2 * | 8/2005 | Ahn | 211/195 |
| 7,314,143 | B1 | 1/2008 | Johnson | |
| 2002/0113390 | A1 * | 8/2002 | Hallman et al. | 280/79.7 |
| 2002/0130098 | A1 * | 9/2002 | Simard | 211/181.1 |
| 2003/0001348 | A1 * | 1/2003 | Weida | 280/47.19 |
| 2005/0067360 | A1 * | 3/2005 | Darvial | 211/41.14 |
| 2005/0275178 | A1 * | 12/2005 | Huesdash et al. | 280/47.35 |
| 2008/0007019 | A1 * | 1/2008 | Sparkowski | 280/79.3 |
| 2008/0087620 | A1 * | 4/2008 | Sparks | 211/187 |
| 2009/0014400 | A1 * | 1/2009 | Nawrocki | 211/90.03 |

OTHER PUBLICATIONS

Steck MFG, 1988, Parts/Equipment Cart brochure.
Herkules, 1988, Parts Mobile brochure, Walled Lake, MI.
Collision Services, Inc., 1990 catalog—New and Innovative Products, Parts Caddy I & II, p. 7, Hudson, IA.
Collision Services, Inc., 1992 design, Hudson, IA.
Combo-Carts, website-http://combo-carts.com/parts_cart.html, 1995-1997, Parts Cart.
Innovative Tools, 2009, Innovative Parts Cart A, website: http://www.innovativetools.comfinnovative-videos/products/innovative-parts-cart-a/.
Innovative Tools, 2009, Innovative Parts Cart B, website: http://www.innovativetools.com/innovative-videos/products/innovative-parts-cart-b/.
Innovative Tools, 2009, Innovative Parts Cart C, website: http://www.innovativetools.com/innovative-videos/products/innovative-parts-cart-c/.

* cited by examiner

VERSATILE AUTO PARTS CART

CROSS REFERENCE TO RELATED APPLICATION

This application claims priority from co-pending provisional patent application entitled "Versatile Auto Parts Cart," Ser. No. 60/874,812 filed Dec. 14, 2006. The disclosure of provisional patent application Ser. No. 60/874,812 is hereby incorporated in its entirety.

FIELD OF THE INVENTION

This invention pertains to transport and storage carts for auto body parts used in automobile body repair facilities.

BACKGROUND OF THE INVENTION

In the repair of the bodies of motor vehicles, numerous replacement and repair parts are needed to make appropriate repairs. Frequently, parts removed from an auto under repair may be reusable and need to be stored pending reinstallation.

In order to make the repair of a given vehicle as efficient as possible, it is useful to collect the necessary items to make the body repair and to transport these parts to a centralized location near the work site. In order to do this, the repair worker must either make several trips from the parts department to the work site where the auto to be repaired is located, or the repair worker may take a wheeled cart or dolly to the parts storage area, collect the necessary parts for the repair, place them on the wheeled cart and then transport the cart to the location of the auto to be repaired. One example of a prior art wheeled cart is the PARTS CADDY™ auto parts cart distributed by Collision Services, Inc., of Hudson, Iowa (see http://www.partscaddy.com/page1.html.) This wheeled cart is a four-post shelf unit supported on casters with a cage surrounding the lower shelf. Hook members may hang from the upper perimeter of the shelf unit. This type of cart is limited in the size of parts which may be stored within the cart, with large panel parts only transportable by hanging them from the hook members on the exterior of the cart. This prior art cart does not provide adequate protection from damage for large body panels moved in the transport process. No adjustability of shelves is provided. In addition, this existing cart has a fairly large footprint regardless if it is in use or not.

A versatile auto parts transport cart is needed which can store large panels without risk of their swinging about the transport cart. A cart which includes features to store long narrow parts, as well as small fasteners of various varieties, would be advantageous. In addition, a transport cart for auto body repair parts which may be nested with others of the same type would reduce the space needed when the cart is not in use.

BRIEF SUMMARY OF THE INVENTION

An improved auto parts transport and storage cart includes a base featuring a pair of horizontal legs supported on casters which are independently adjustable such that the legs may be set in parallel or divergent. An upright frame, supported upon first ends of the legs, includes a pair of upright members separated by horizontal cross bars. The upright members include slots in pairs and triads into which tabs of shelves and baskets may be inserted such that the attached members are cantilevered from the upright members. When the cart is to be stored, the shelves or baskets may be disconnected from the upright members and may be hung by hooks on their bracket ends from the uprights.

A leg extension may be pivotally attached to each leg such that the leg extensions may be folded into a vertical position when stored. Each leg extension is easily detachable from the leg. Each leg extension has at least two cushioned posts extending perpendicularly from it, with narrow spaces between adjacent posts, such that auto body panels or windshields may be supported between adjacent posts.

Elongate support arms may also optionally be cantilevered to either of the uprights by insertion of tabs on them into slots along the upright members. Hooks are featured on the ends of the elongate support arms which allow the arms to be hung from the uprights when not in use to support auto body parts. A trim tray is mounted atop the upright members so that long trim strips can be carried in the tray. Elastic cords and S-hooks can suspend other parts from the upper cross bars between the upright members or from shelf support brackets or from the support arms.

With the legs positioned to diverge as they extend away from the upright frame, and with the support arms and shelves and baskets suspended for storage from the upright members, a second unit of the cart may be nested with the first unit for efficient space-conserving storage.

When in condition to receive auto body parts, the cart invention can be wheeled to the parts department or to a delivery truck and loaded with all parts necessary to make a complete repair of a given vehicle needing collision repair. Having been loaded, the cart invention can be moved to a location near the auto to be repaired and parts removed from the cart invention as needed. In addition, reusable parts removed from the auto under repair may be temporarily stored in the baskets or on the shelf or, if small enough, in a small parts drawer which may be hung from one of the shelves or baskets.

It is a primary object of the invention to provide a parts storage and transport cart for parts to be used to repair the body of a vehicle, and to store and transport such parts with reduced risk of damage to the parts.

It is a further object to provide an auto body parts storage and transport cart which allows parts of various sizes and shapes to be stored together on a single transport cart.

It is also an object of the invention to provide a versatile auto parts transport cart which can be transformed to a storage condition in which the cart occupies less floor space and which allows nesting of other cart units to reduce the footprint needed for the stored carts.

It is a further object of the invention to provide an auto parts cart which can optionally transport and store auto body panels between cushioned upright posts mounted to leg extensions selectively attachable to the variably spaced legs of the invention.

These and other salutary objects of the invention will be better understood from a close examination of the drawing figures and detailed description which follows.

BRIEF DESCRIPTION OF THE SEVERAL VIEWS OF THE DRAWING(S)

DETAILED DESCRIPTION OF THE INVENTION

Figure 1A:
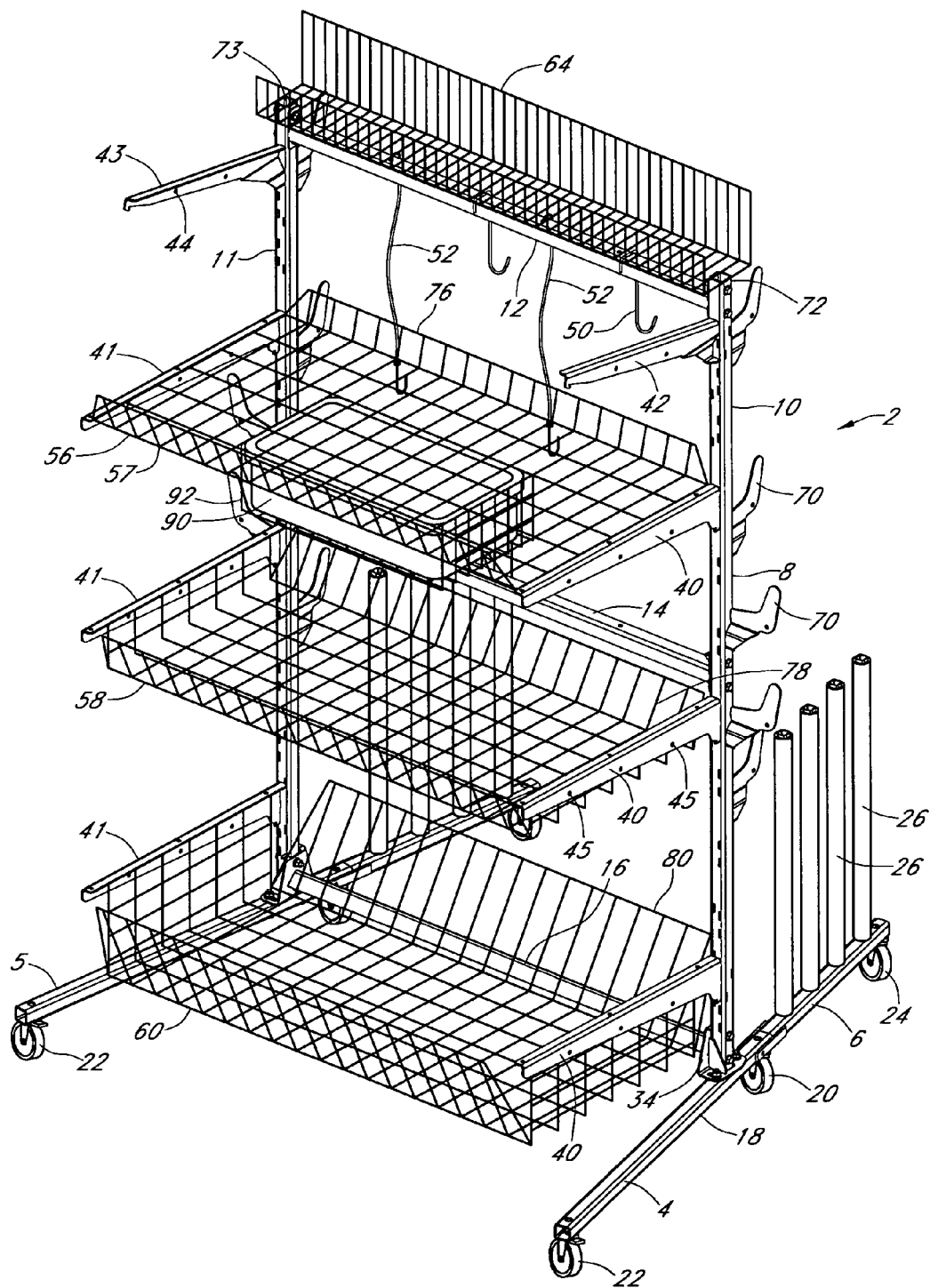
FIG. 1A is a front right perspective of the invention in a preferred configuration.

Referring to the drawing figures and initially to FIG. 1A, the invention auto parts cart 2 is shown in a preferred configuration. Invention 2 comprises a base 18 comprising a pair of spaced apart legs 4 and 5 each of which is supported by at least two casters 20 and 22. Supported upon base 18 is upright frame 8 which comprises a pair of spaced apart upright members 10 and 11 with each upright member 10 and 11 connected to each leg 4 and 5 by a leg attachment bracket 34. Leg attachment brackets 34 permit legs 4 and 5 to be selectively adjusted from a parallel relationship therebetween to a diverging orientation as they extend from their attachment to upright members 10 and 11 respectively.

Upright members 10 and 11 are joined by horizontal crossbars 12, 14 and 16 such that the upright members 10 and 11 are maintained substantially in parallel and vertical.

Mounted coaxially to each leg 4 and 5 are leg extensions 6 which are supported by legs 4 and 5 and by third casters 24. Extending substantially perpendicularly from leg extensions 6 are at least two, and preferably four, elongate posts 26 which are spaced apart sufficiently to receive auto body panels or windows between adjacent posts 26. Preferably posts 26 are approximately two feet tall.

Shallow shelf 56 is mounted to upright members 10 and 11 above medium depth basket 58. Mounted below medium depth basket 58 in this configuration of the invention 2 is a deep basket 60. Each of shelf 56 and basket members 58 and 60 comprises a pair of shelf support bracket 40 and 41 each having a mounting end which is removably retained to one of upright members 10 and 11 of upright frame 8. Shelf 56 and each of baskets 58 and 60 includes an inclined back stop 76, 78 and 80. Shelf support brackets 40 and 41 are provided with openings 45 therealong which may receive S-hooks 50 or the ends of braided elastic cords 52. Shelf 56 and baskets 58 and 60 may receive auto body parts of sizes which can be supported fully therein.

Elongate support arms 42 and 43 also extend from upright members 10 and 11. In the embodiment of FIG. 1A, support arms 42 and 43 are detachably mounted to upright members 10 and 11 above shelf 56 and are shown as paired. However each elongate support arm 42, 43 is independent from the other and only one support arm 42, 43 may be desirable in some instances as may be multiples of support arms 42 and 43. Openings 44 are provided along elongate support arms 42 and 43 to receive S-hooks 50 as desired, or to allow attachment of braided elastic cords 52 thereto.

Mounted above upper cross bar 12 to top ends 72 and 73 of upright members 10 and 11 is elongated open ended trim tray 64 which is adapted to carry elongate narrow strips such as automobile body trim pieces or moldings. S-hooks 50 and braided elastic cords 52 may be supported from upper cross bar 12 because of vertical spacing between trim tray 64 and upper cross bar 12.

It is to be understood that invention 2 can be configured in differing ways because shelf 56 and baskets 58 and 60 are easily detachable, as are short arms 70 and elongate support arms 42 and 43. Leg extensions 6 are also easily detached from legs 4 and 5.

Suspended from wire shelf 56 is small parts drawer 90 which is slidable within wire drawer support 92 which attaches selectively to wire floor 57 of shelf 56. Wire drawer support 92 may also electively be suspended from the underside of medium basket 58 or deep basket 60.

Figure 5:
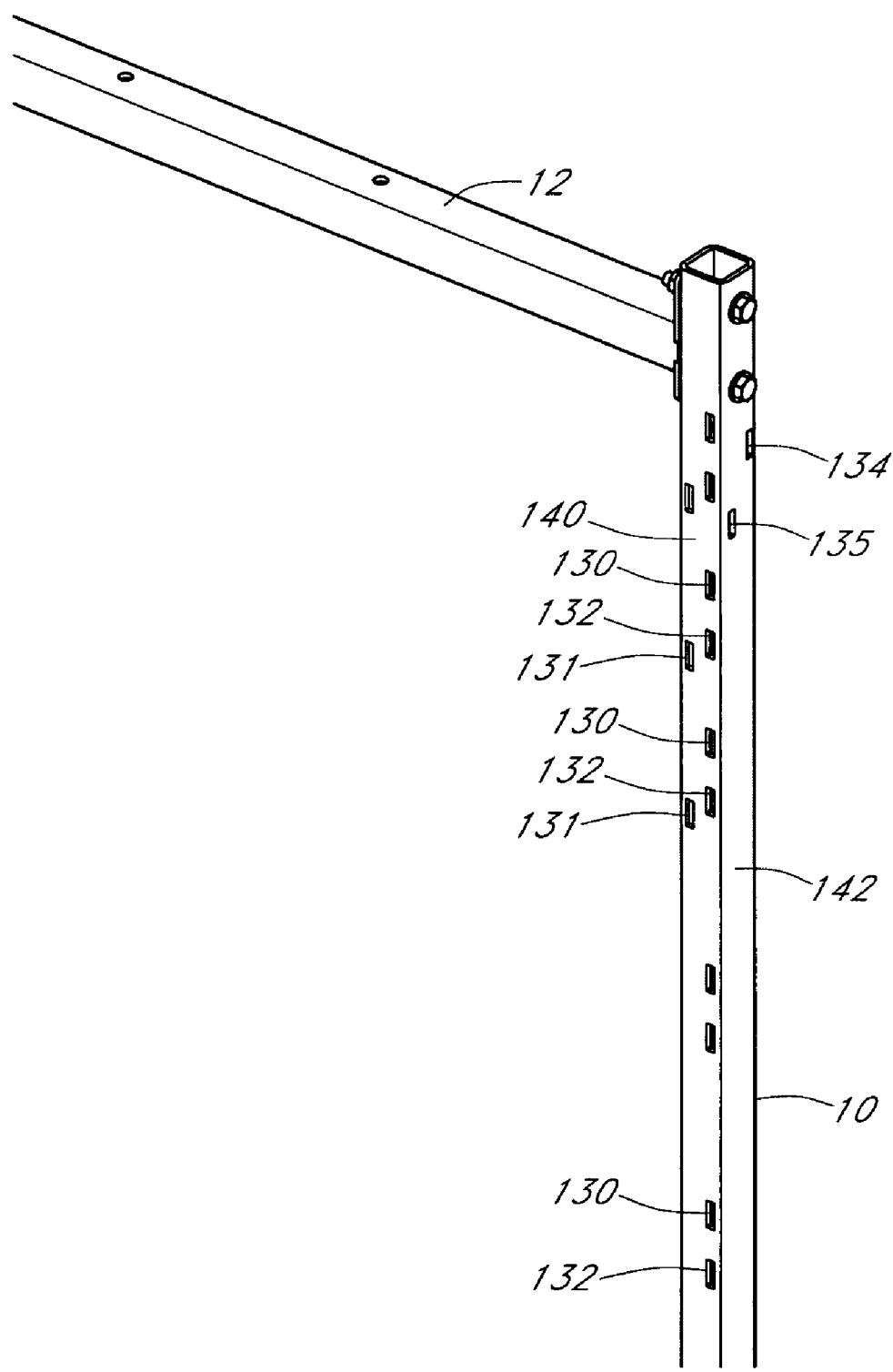
FIG. 5 is an enlarged perspective of an upright member and cross member of the frame of the invention, with parts thereof cut away.

Shelf 56 and each basket member 58 and 60 may be omitted altogether or located at different heights along upright members 10 and 11 because the shelf support brackets 40, 41 thereof include tabs 101 (see FIG. 8) which are selectively received in slots 130 and 132 along upright members 10 and 11 (see FIG. 5).

Figure 1B:
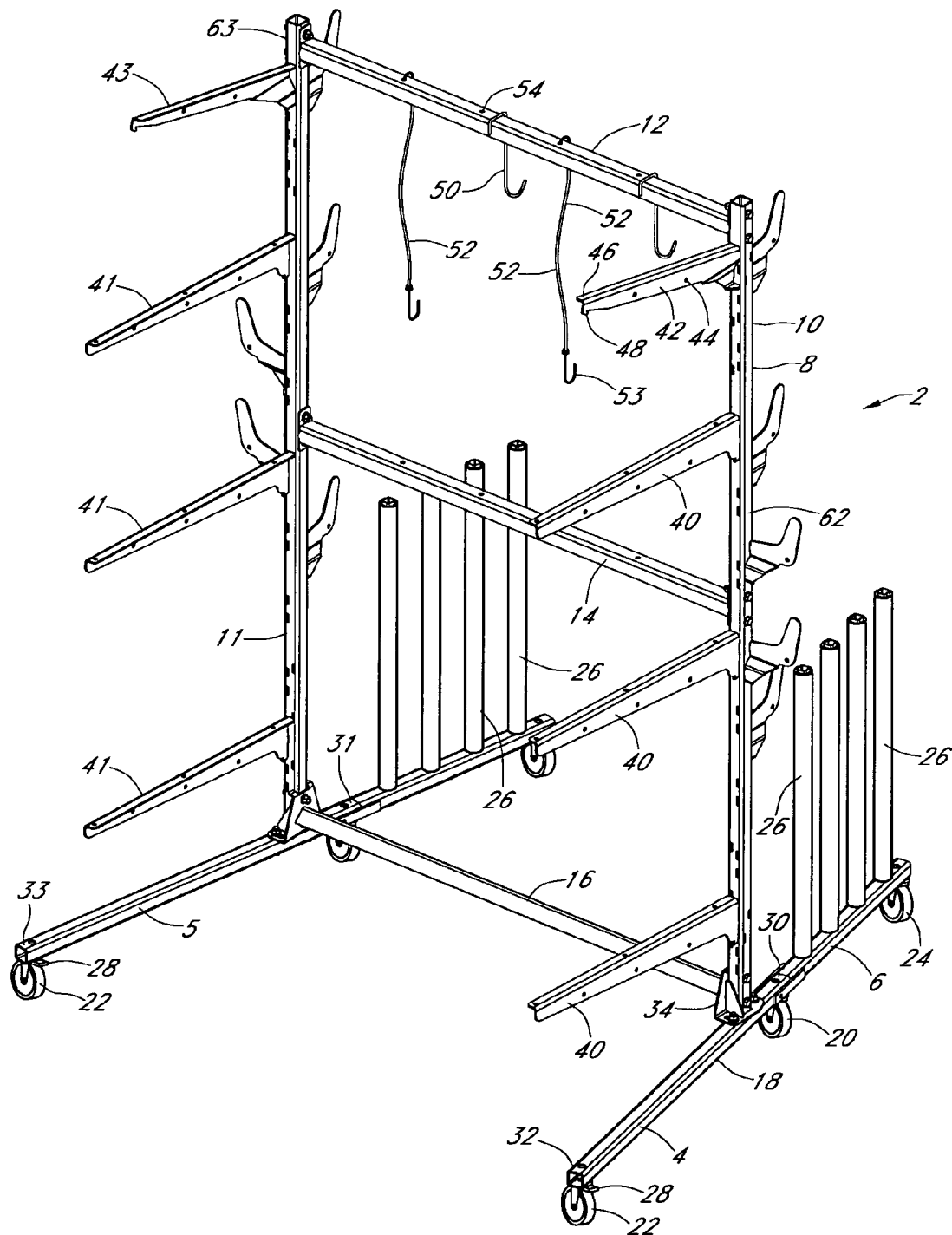
FIG. 1B is a front right perspective of the invention with shelf and basket members omitted.

Referring now to FIG. 1B, the invention 2 is skeletally illustrated in a first alternate configuration with parts omitted to assist in examination of the structure thereof. Invention 2 comprises a base 18 comprising a pair of spaced apart legs 4 and 5, each of which being supported by at least two casters 20 and 22 with the first caster 20 located at or adjacent first end 30 of leg 4 and second caster 22 mounted to and supportive of leg 4 at second end 32 thereof. Each second caster 22 may include a caster lock 28.

Supported upon base 18 and mounted thereto adjacent first ends 30 and 31 of legs 4 and 5 is upright frame 8 which includes a pair of spaced apart upright members 10 and 11 with each upright member 10 and 11 connected to each leg 4 and 5 by a leg attachment bracket 34. Leg attachment brackets 34 permit legs 4 and 5 to be selectively adjusted from a parallel relationship therebetween to a diverging orientation such that the angular separation between legs 4 and 5 may be increased up to at least approximately twenty degrees with second ends 32 and 33 of legs 6 diverging. Preferably upright members 10 and 11 are identical except one is the inversion of the other.

Upright members 10 and 11 are joined by horizontal cross bars 12, 14 and 16 such that the upright member 10 and 11 are maintained substantially in parallel and vertical. Each cross bar 12, 14 and 16 may be an L-shaped bar.

Cantilevered from upright members 10 and 11 are paired shelf support bracket 40 and 41 to which a wire shelf or a basket may be attached such as illustrated as shelf 56 and baskets 58 and 60 of FIG. 1A. Each shelf support bracket 40 and 41 is a mirror image of the other shelf support arm of the pair.

Also cantilevered from uprights 10 and 11 are a pair of elongate support arms 42 and 43, which are preferably shorter than shelf support bracket 40 and 41. Each support arms 42 and 43 is selectively independently relocatable along upright member 10 and 11. Each support arms 42 and 43 includes one or more openings 44 therealong, as well as hook elements 48 at the free ends 46 thereof. Hook elements 48 allow elongate support arms 42, 43 to be suspended alongside upright members 10 and 11 in a storage position.

One or more S-hooks 50 and braided elastic cords 52 may be suspended from either of horizontal cross bars 12 and 14 but are best attached to upper cross bar 12. Openings 54 in upper cross bar 12 allow end hooks 53 of cords 52 to be received therein for attachment of end hooks 53 to upper cross bar 12. Openings 44 in elongate support arms 42 and 43 permit S-hooks 50 or elastic cords 52 to be suspended therefrom. Similarly openings 45 of bracket members 40 and 41 allow S-hooks 50 and elastic cords 52 to be suspended therefrom as desirable.

Short support arms 70 may be selectively detachably mounted to upright members 10 and 11. Short arms 70 are useful to suspend assorted smaller auto body parts which are amenable to being suspended. Tabs on short arms 70 may be received in slots located along outer sides 62 and 63 of upright members 10 and 11.

Mounted coaxially to each leg 4 and 5 at second ends 30 and 31 thereof are leg extensions 6 which are supported by legs 4 and 5 and by third casters 24. Extending substantially perpendicularly from leg extensions 6 are at least two and preferably four, upright elongate posts 26 which are spaced apart sufficiently to receive auto body panels or windows between adjacent posts 26. Preferably posts 26 are sufficiently elongate to support large auto body panels, and preferably are approximately two feet long and are sheathed in a cushioned sleeve, such as a resilient foam sleeve.

Leg extensions 6 are selectively mountable to second ends 32 and 33 of legs 4 and 5 respectively and are pivotal about a horizontally disposed locking pin so that each leg extension 6 may be folded about the second end 32, 33 of leg 4, 5 to which it is attached.

Figure 2:
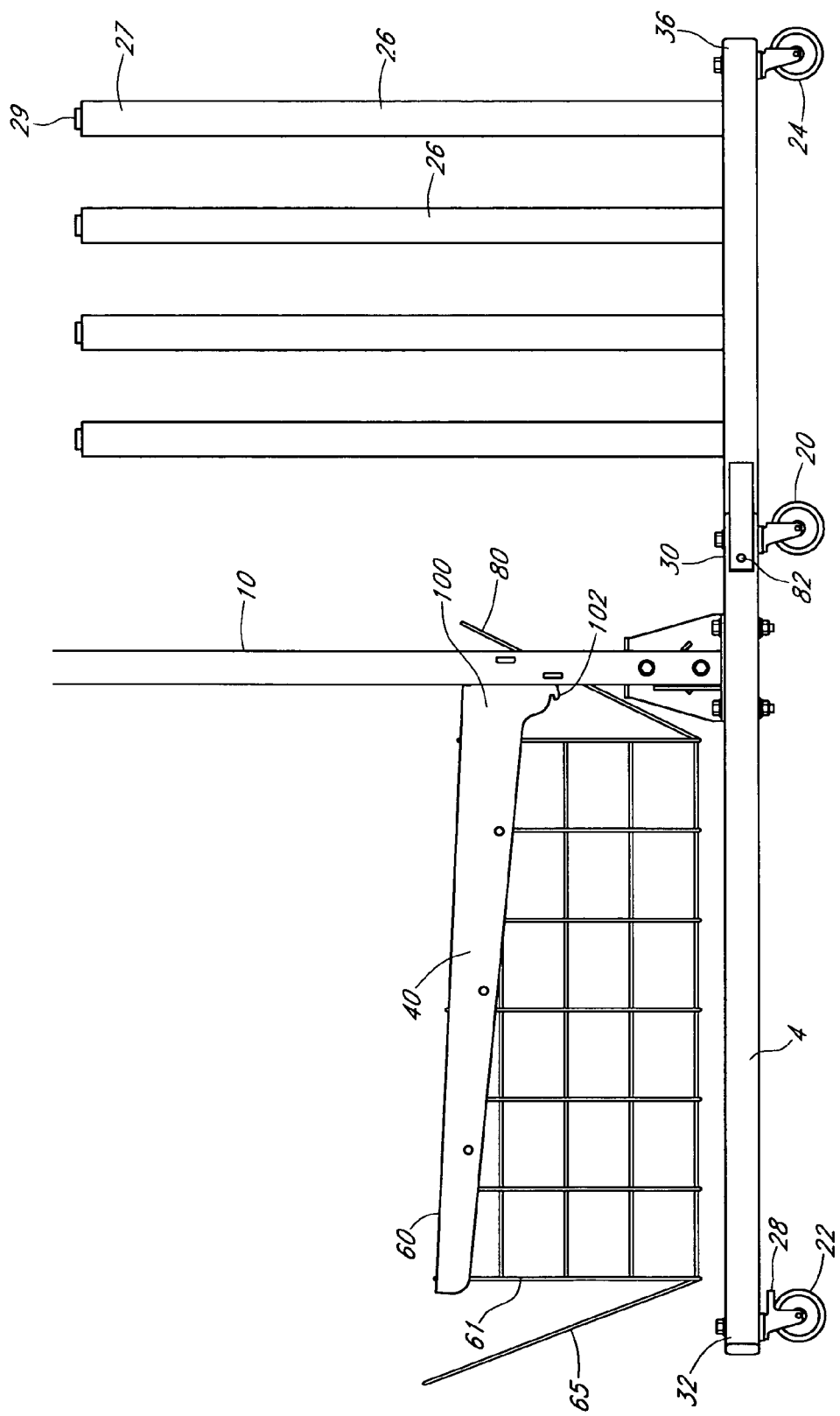
FIG. 2 is an enlarged side plan view of the lower part of the invention with some parts thereof omitted.

Referring now to FIG. 2, additional detail pertaining to leg extensions 6 may be observed. It may be seen that leg 4 is supported by first caster 20 and second caster 22 mounted near first end 30 and second end 32 respectively of leg 4. Leg extension 6 is hinged to first end 30 of leg 4 by removable horizontally disposed pin 82 which functions to retain leg extension 6 to leg 4 and as an axle around which leg extension 6 may rotate. Posts 26 stand upright upon leg extension 6 and are spaced apart to leave gaps therebetween into which sheet-like automobile parts such as hood panels, may be received. Each post 26 is preferably cushioned by a foam sleeve 27 on its exterior, which surrounds a rod 29. It is seen that leg extension 6 is supported by first end 30 of leg 4 and by third caster 24 which is mounted adjacent free end 36 of leg extension 6.

Upright member 10 is seen to extend vertically and essentially perpendicularly from leg 4. Deep basket 60 is seen cantilevered from upright member 10. Deep basket 60 includes basket frame 61 which depends from shelf support bracket 40. Shelf support bracket 40 joins upright member 10 at almost a perpendicular, inclining slightly as it extends from upright member 10. Front wall 65 of basket frame 61 extends outward and backstop 80 extends rearward.

Figure 8:
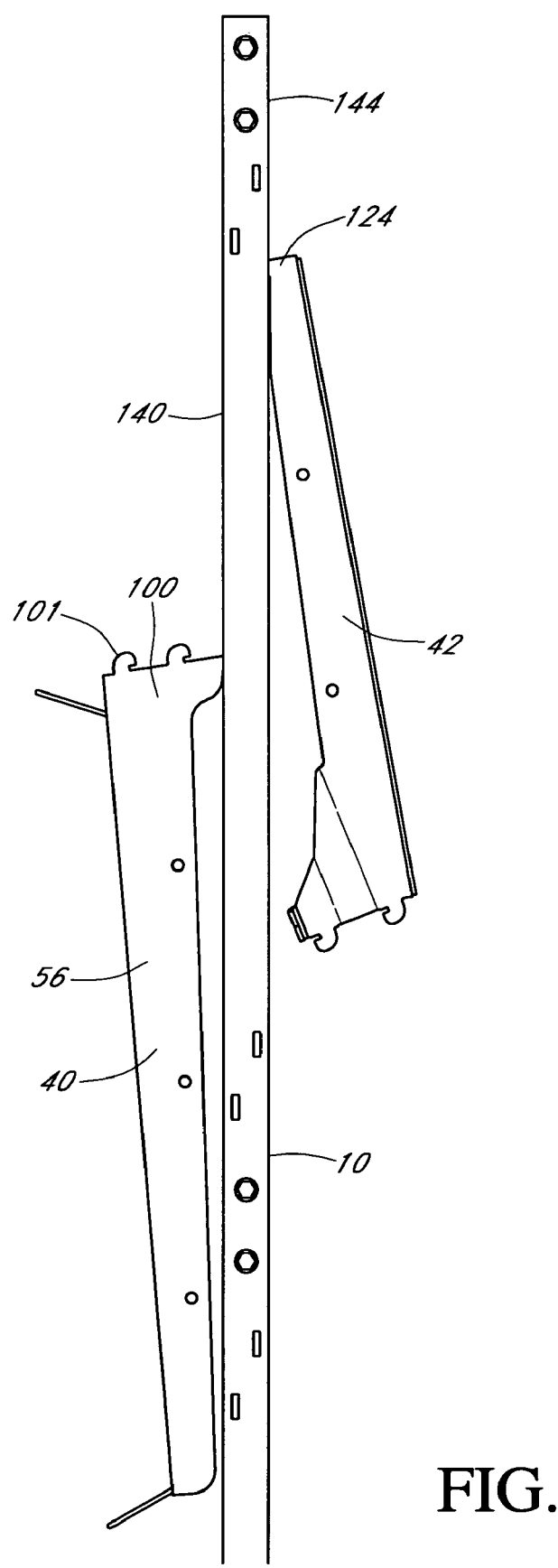
FIG. 8 is a side plan view of an upright member of the invention, with a support arm and a shelf attached to the upright in a storage configuration.

Shelf support bracket 40 includes bracket element 100 which attaches to upright member 10 by tabs 101 (see FIG. 8). Bracket element 100 includes a hook device 102 depending therefrom at a substantial nonparallel to the longitudinal axis of shelf support bracket 40 such that when deep basket 60 is disconnected from upright member 10, it may be manually pivoted downward and hook device 102 may be received in a slot higher along upright member 10 so that deep basket 60 may hang therefrom. Shelf support bracket 40 and its mirror image, shelf support bracket 41, in pairs may support medium depth basket 58 or shelf 56.

Figure 3A:
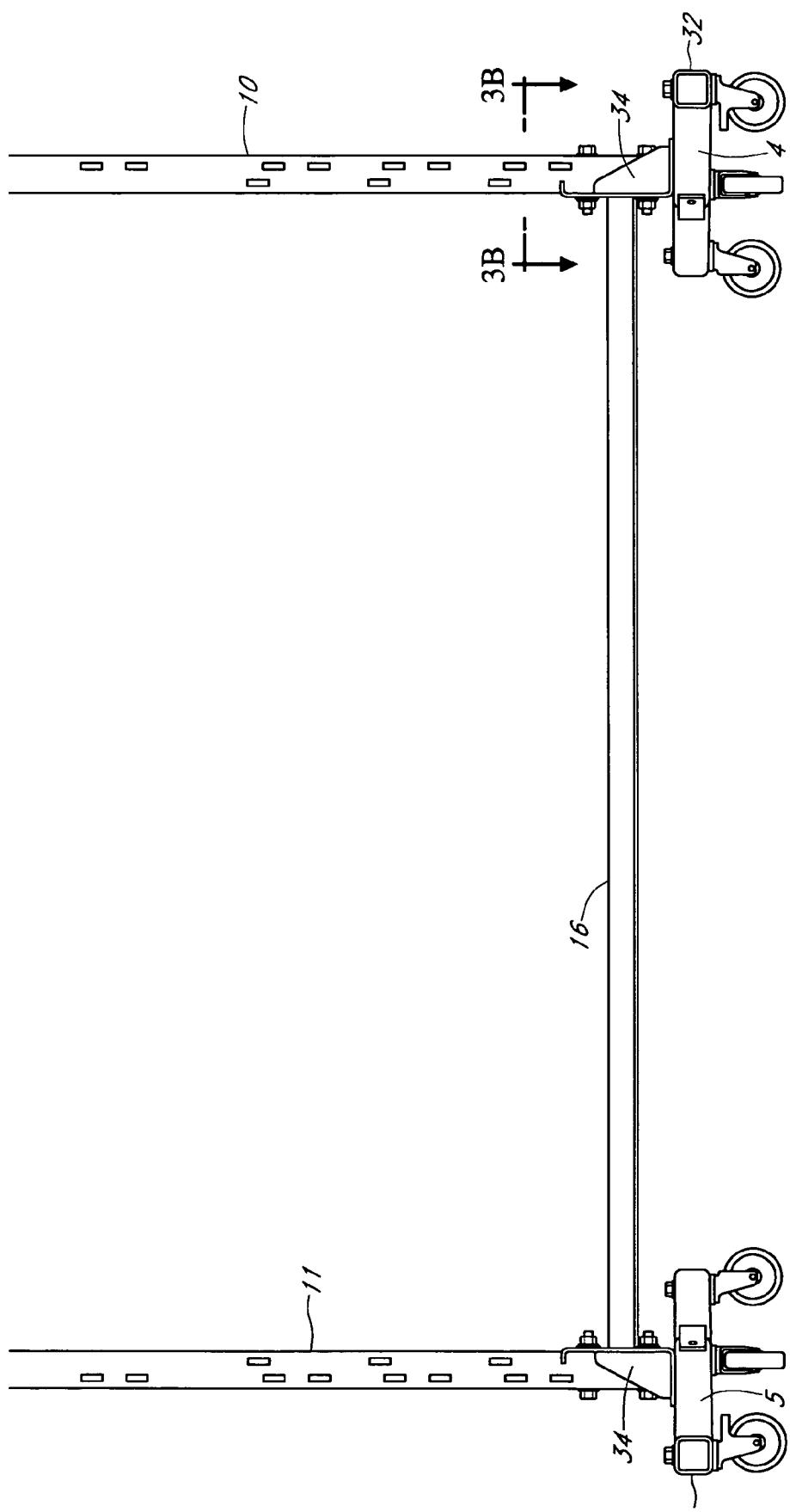
FIG. 3A is an enlarged front elevation of the lower part of the invention with some parts omitted.
Figure 3B:
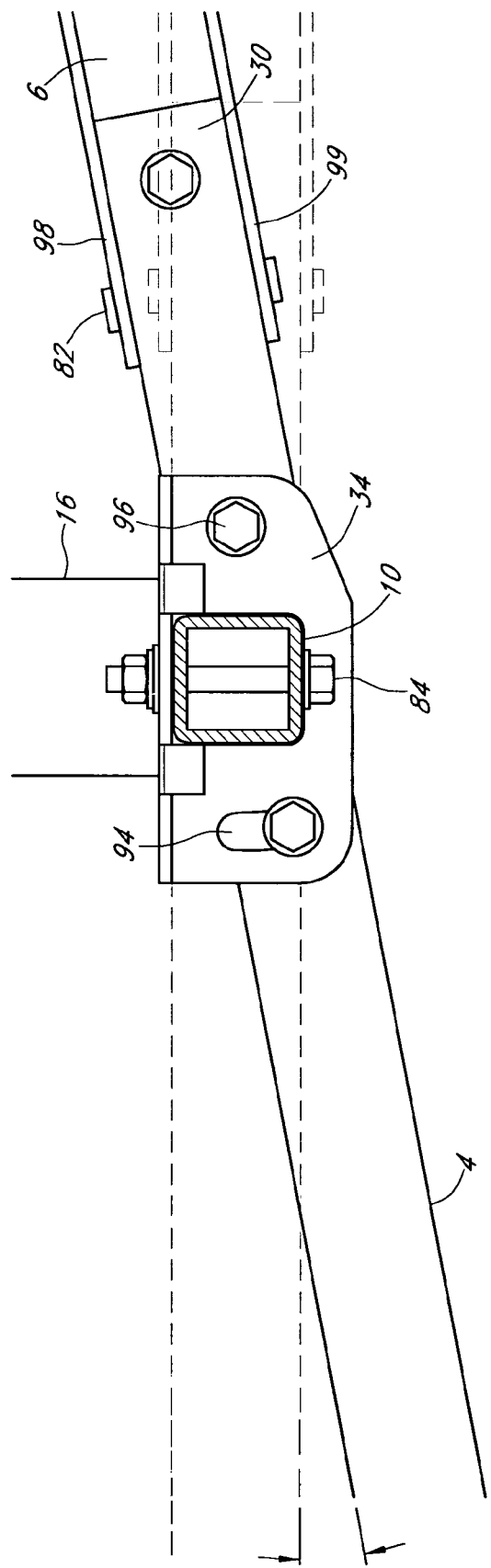
FIG. 3B is a section view taken along lines 3B-3B of FIG. 3A.

FIGS. 3A and 3B illustrate the variability of the spacing between second ends 32 and 33 of legs 4 and 5. In FIG. 3A, legs 4 and 5 are adjusted to diverge as they extend from upright members 10 and 11. Leg spacing brackets 34 mount upright members 10 and 11 to legs 4 and 5 while lower cross bar 16 is also retained to upright member 10 and 11 by leg spacing brackets 34. When legs 4 and 5 are adjusted to a diverging disposition as seen in FIGS. 3A and 3B, units of invention 2 may be nested together, after shelves 56 and baskets 58 and 60 have been relocated to their respective storage position as illustrated in FIG. 8. In FIG. 3B it can be seen that leg spacing bracket 34 includes slotted opening 94 which permits selective orientation of leg 4 from a perpendicular to lower cross bar 16 as shown in phantom, to at least approximately ten degrees from perpendicular to lower cross bar 16. Leg 4 may be pivoted about bolt 96 when bolt 96 is loosened to permit leg 4 to be adjusted relative to lower cross bar 16.

It can also be observed in FIG. 3B that leg extension 6 includes ears 98 and 99 which extend along first end 30 of leg 4 such that pin 82 may act as a horizontal hinge about which leg extension 6 may pivot.

Leg attachment bracket 34 is secured by welding to lower cross bar 16 and is bolted to upright member 10 by bolt 84.

Figure 4A:
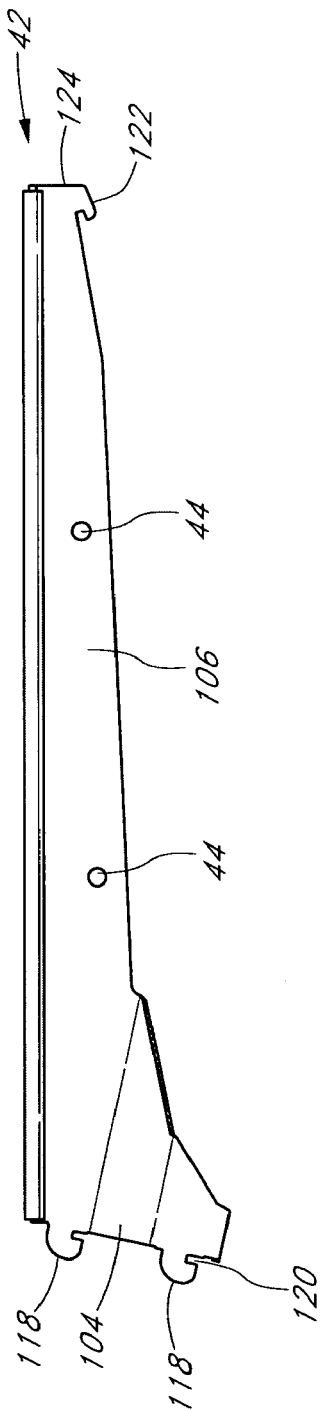
FIG. 4A is a side plan view of an arm member of the invention.
Figure 4C:
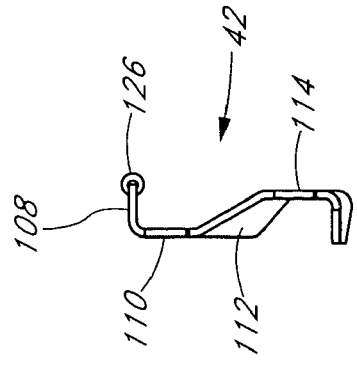
FIG. 4C is a front elevation of the arm member of FIG. 4A.
Figure 4B:
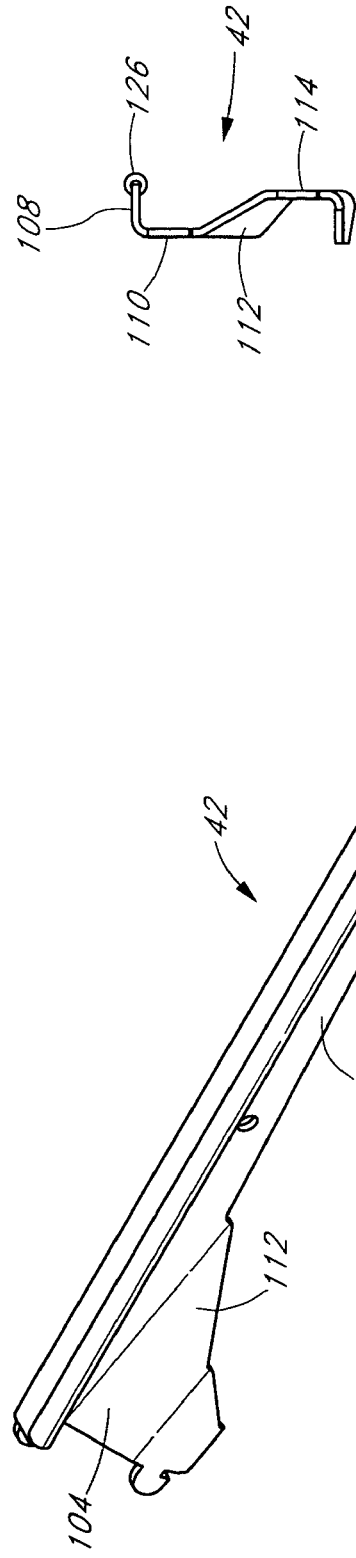
FIG. 4B is a left perspective of the arm member of FIG. 4A.

Referring now to FIGS. 4A, 4B and 4C, an elongate support arm 42 is shown in enlargement. FIGS. 4A, 4B and 4C illustrate that support arm 42 comprises a bracket element 104 and an elongate rib 106 on which upper ledge 108 is supported. An elastomeric strip 126 is received on the free edge of upper ledge 108. Bracket element 104 comprises an upper segment 110 transitioning to an angled transverse segment 112 which transitions to a lower vertical segment 114 which terminates in a lower transverse ledge 116. At least two tabs 118 extend from bracket element 104, each tab 118 having an underside slot 120 which receives the lower edge of a slot such as slot 130 of upright member 10 (see FIG. 5). Angled transverse segment 112 and lower transverse ledge 16 provide horizontal stability to support arm 42 when attached to an upright member 10 and 11 by tabs 118. Openings 44 along rib 106 may receive S-hooks 50 or the hooks 53 of braided elastic cords 52. Hook 122 is featured at distal end 124 of elongate support arm 42. Hook 122 depends from distal end 124 at an approximate right angle from the longitudinal axis of elongate rib 106. Except for elastomeric strip 126, all parts of elongate support arm 42 may be integral, formed from steel or other rigid material, preferably coated with a resilient coating.

Figure 6:
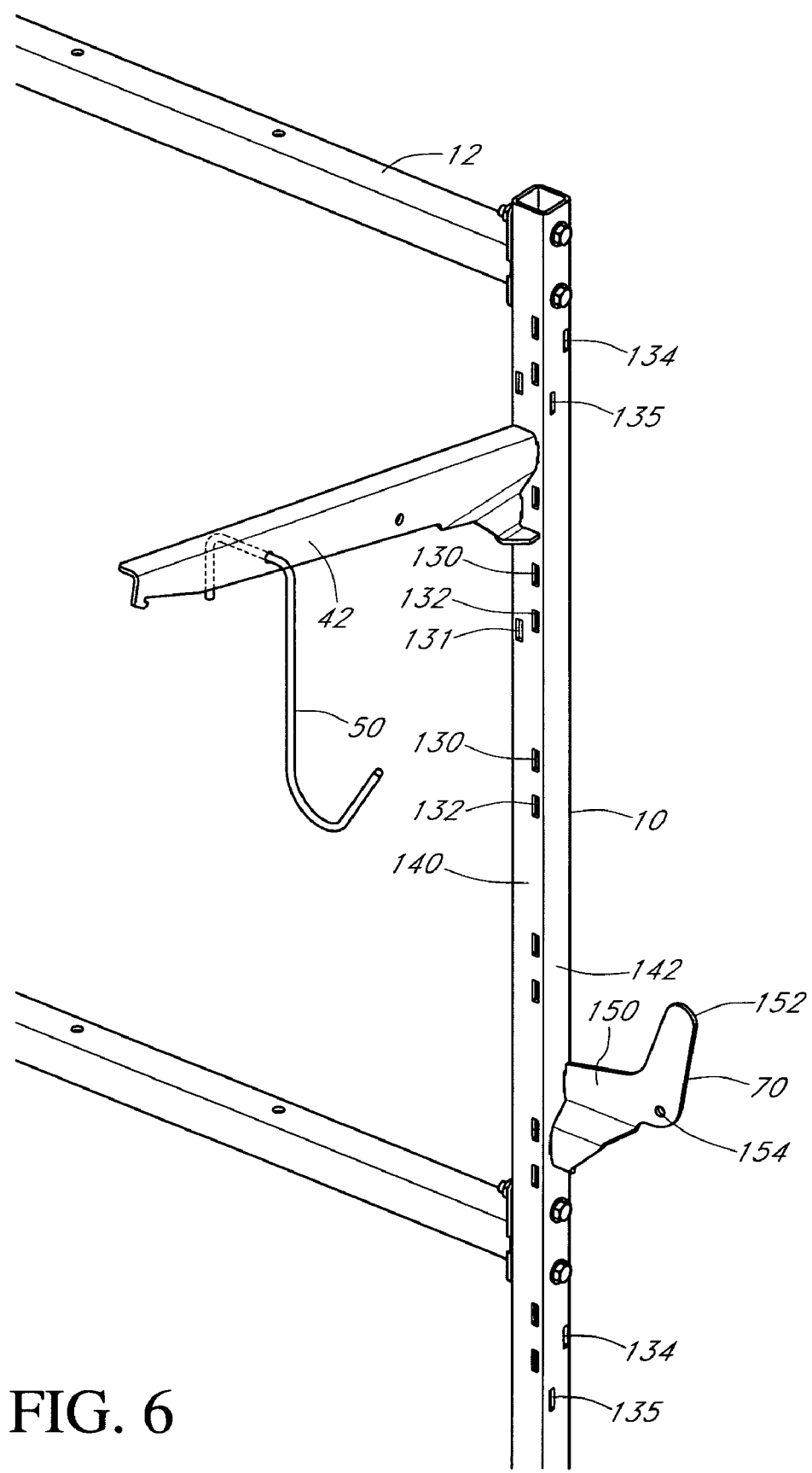
FIG. 6 is an enlarged perspective of an upright member and cross member of the frame with an elongate support arm and a short arm mounted thereto.

FIGS. 5 and 6 are enlargements of upright member 10 and its mounting to upper cross bar 12. Upright member 10 includes sets of three slots, along front side 140 thereof, with two of the slots 130 and 132 vertically aligned and the third slot 131 offset and slightly below the lower slot 132.

Outer side 142 of upright member 10 includes paired slots 134 and 135 which are offset both horizontally and vertically. The spatial relationship between slots 134 and 135 is identical to slots 130 and 131 so that short arm 70 or an elongate support arm 42 may be selectively be attached to either front side 140 or outer side 142 of upright 10.

Front side 140 also includes other pairs of vertically aligned slots 130 and 132. Triad slots 130, 131 and 132 are designed to receive either tabs 118 of elongate support arms 42 or vertically aligned tabs extending from shelf support bracket 40 and 41 of shelf 56 or baskets 58 and 60. Paired slots 134 and 135 of outer side 142 are designed to receive tabs of short arm 70, or tabs 118 of elongate support arm 42.

FIG. 6 also shows upright 10 configured with an elongate support arm 42 from which an S-hook 50 is suspended. Elongate arm 42 is cantilevered to front side 140 of upright bar member 10 and supported thereon by bracket element 104 (also see FIG. 4A).

Short arm 70 is selectively mounted to outer side 142 of upright member 10 by insertion of tabs thereon into paired slots 134 and 135.

Short arm 70 includes a generally horizontal leg 150 from which a generally vertical blade 152 extends. Horizontal leg 150 may be generally the same length as vertical blade 152.

An opening 154 for an S-hook 50 is provided in short arm 70. Preferably short arm 70 is coated with a non-marring coating to avoid scratching an auto part hung therefrom.

Figure 7:
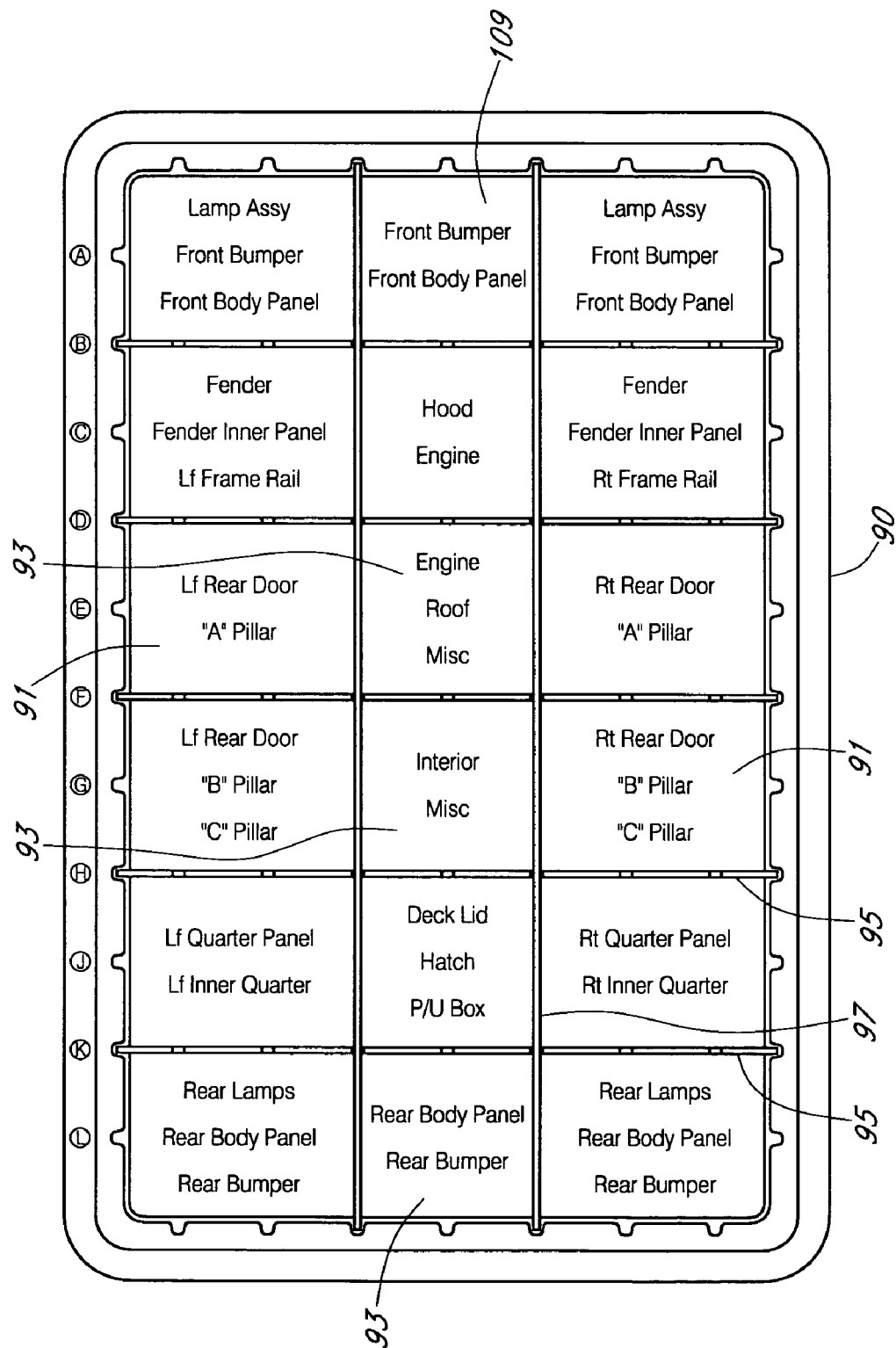
FIG. 7 is an enlarged top plan view of a small parts box attachable to a shelf of the invention.

FIG. 7 illustrates a top view of a small parts drawer 90. The interior of small parts drawer 90 has been divided into labeled compartments 91 and 93 by dividers 95 and 97. Disposed below dividers 95 and 97 is label panel 109 segmented by grid markings to match compartments 91 and 93 and marked to identify parts which may be stored in compartments 91 and 93.

FIG. 8 shows an upright member 10 with an elongate support arm 42 suspended from rear side 144 by hook 122 (see FIG. 4A) at its distal end 124. Shelf 56 is also suspended by its bracket element 100 by bracket end hook 102 (see FIG. 2) to front side 140 of upright member 10.

With elongate support arm 42 and shelf 56 so suspended and with legs 4 and 5 in a diverging orientation, another unit of invention 2 may be nested adjacent shelf support bracket 40 provided that its optional leg extensions 6 are pivoted upward or removed.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

We claim:

1. Apparatus to store and transport parts for automobiles comprising
a base supported on casters,
the base comprising spaced apart elongate legs,
an upright frame supported upon the base,
the upright frame disposed generally adjacent a first end of each of the legs,
an elongate leg extension extending from the first end of each leg,
a plurality of spaced apart upright elongate posts supported on each leg extension,
each leg extension is selectively pivotable about the first end of the led from which said leg extension extends,
whereby a panel may be received between adjacent ones of the spaced apart upright posts.

2. The apparatus of claim 1 wherein
each leg extension is coaxial with the leg from which it extends.

3. The apparatus of claim 1 wherein
each of the legs includes a second end opposite the first end thereof,
each leg selectively adjustable to vary the spacing between second ends thereof.

4. The apparatus of claim 1 wherein
each leg extension is selectively detachable from the leg from which it extends.

5. Apparatus to store and transport parts for automobile body repair comprising
a base supported on casters mounted thereto,
the base comprising spaced apart elongate legs,
an upright frame supported upon the base,
the upright frame disposed generally adjacent a first end of each of the legs,
the frame including a front side and a rear side and further comprising spaced apart upright members,
at least one automobile body part supporting element selectively supported generally horizontally upon the front side of the upright frame,
the at least one automobile body part supporting element selectively supported generally vertically upon the upright frame,
the upright frame comprises a pair of spaced apart upright members joined by at least one transverse bar,
each upright member having a plurality of slots therein,
the at least one automobile body part supporting element comprises a first bracket element removably mounted to a one of the upright members,
the at least one automobile body part supporting element further comprises a second bracket element removably mounted to an other of the upright members,
the first and second bracket elements supporting a wire frame therebetween,
the bracket elements selectively mountable at first ends thereof to the upright members,
the first end of each bracket element including a hook element,
whereby the at least one automobile body part supporting element may be detached from the upright frame and suspended therefrom by the hook elements of the first ends of the bracket elements.

6. The apparatus of claim 5 wherein
the at least one automobile body part supporting element comprises tabs receivable in slots of the upright frame.

7. The apparatus of claim 5 wherein
at least one elongate support arm is selectively cantilevered from a one of the upright members.

8. The apparatus of claim 5 wherein
at least a second automobile body part supporting element is supported generally horizontally upon the rear side of the upright frame,
the at least a second automobile body part supporting element selectively detachable from the upright frame.

9. The apparatus of claim 8 wherein
each leg comprises a leg extension extending from the first end of the leg,
the leg extensions spaced apart,
each leg extension comprising a plurality of upstanding posts supported thereon,
the upstanding posts having spaces therebetween,
whereby an auto body panel may be supported in an upright position upon the leg extensions between adjacent posts thereof.

10. The apparatus of claim 5 wherein
a narrow elongate wire frame tray is supported on an upper end of the upright frame.

11. Apparatus to store and transport parts for automobile body repair comprising
a base supported on casters mounted thereto,
the base comprising spaced apart elongate legs,
an upright frame supported upon the base,
the upright frame disposed generally adjacent a first end of each of the legs,
the frame including a front side and a rear side and further comprising spaced apart upright members,
at least one automobile body part supporting element selectively supported generally horizontally upon the front side of the upright frame,
the at least one automobile body part supporting element selectively supported generally vertically upon the upright frame, the upright frame comprises a pair of spaced apart upright members joined by at least one transverse bar, at least one elongate support arm is selectively cantilevered from a one of the upright members, each upright member has a plurality of slots therein, the at least one elongate support arm selectively detachable from a one of the upright members, the at least one elongate support arm having an attachment end and an opposing distal end, the attachment end including plural tabs extending therefrom, the tabs receivable in slots in the one of the upright members, the distal end of the elongate support arm including a hook element thereon, the hook element selectively receivable in a slot of one of the upright members when the attachment end of the elongate support arm is detached from the one of the upright members.

12. Transport apparatus for auto body parts comprising a base comprising horizontal legs joined by a lower cross bar therebetween, each of the legs independently adjustable such that an angle between each of the legs and the lower cross bar may be selected from a substantial perpendicular to at least approximately ten degrees from perpendicular, an upright frame supported upon the base adjacent first ends of the legs, at least one shelf member selectively attachable to the upright frame, the upright members comprise slots therealong, the first and second side bracket elements including tabs at attachment ends thereof, the tabs of the first and second side bracket elements selectively receivable in selected sets of the slots of the upright members, at least one elongate support arm detachably mounted to one of the upright members, the at least one elongate support arm comprising a first end selectively attachable by tabs extending therefrom to selected ones of the slots of the upright members, the at least one elongate support arm further comprising a hook element at a distal end thereof, the hook element of the at least one elongate support arm selectively receivable in a selected one of the slots of the upright members, a leg extension detachably mounted to each first end of each leg, each leg extension supporting at least two upright elongate posts therealong, the at least two upright elongate posts having panel receiving spaces therebetween, each leg extension selectively pivotable upon the first end of the leg to which it is mounted, the at least one shelf member suspendible from the upright frame by a hook element on an attachment end thereof when the at least one shelf member is in a storage position.

\* \* \* \* \*